W. W. HOWELL.
Cotton Gin.
No. 27,290.  Patented Feb. 28, 1860.
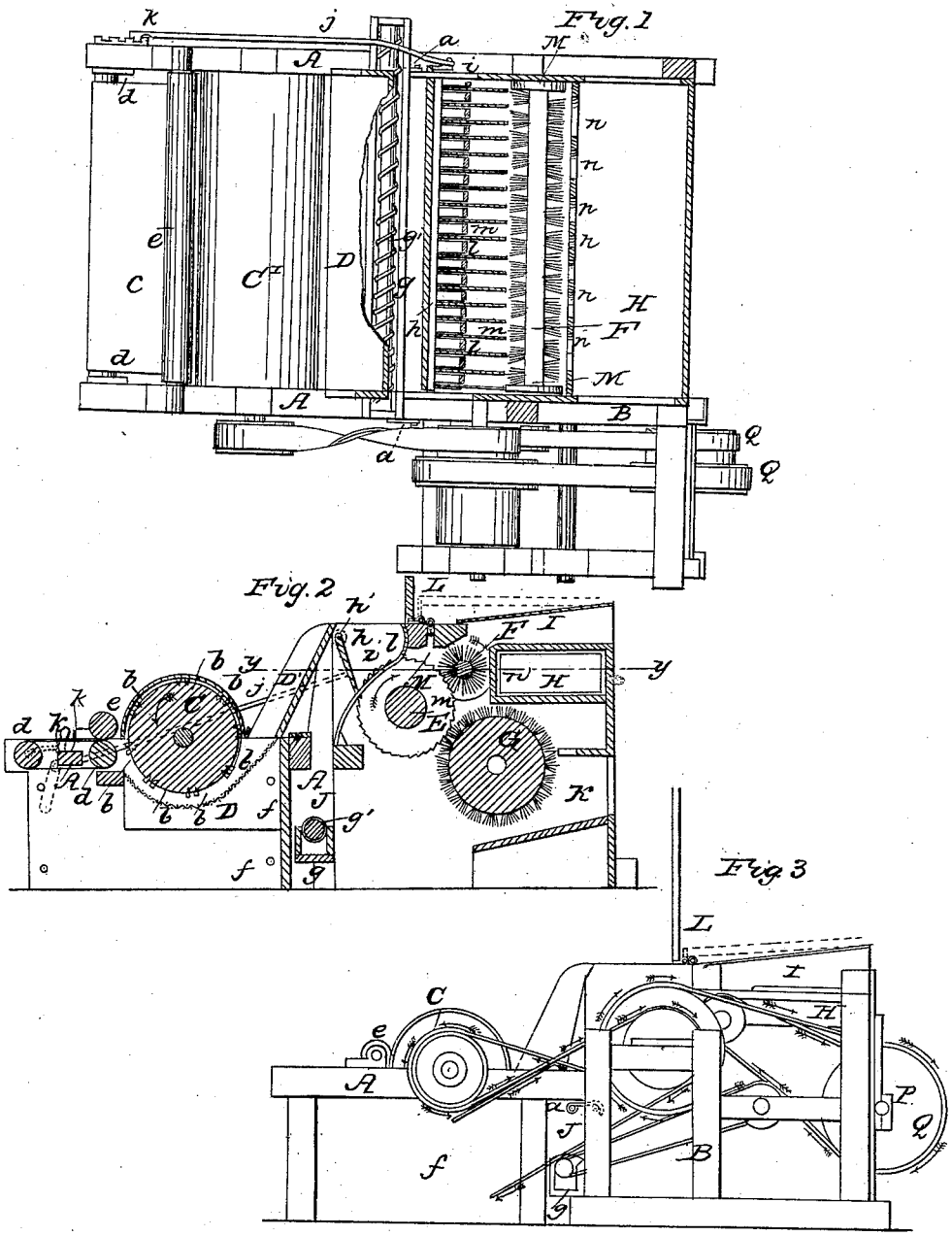
Witnesses
Inventor
W. W. Howell

UNITED STATES PATENT OFFICE.

W. W. HOWELL, OF COLUMBUS, MISSISSIPPI.

IMPROVEMENT IN COTTON-GINS.

Specification forming part of Letters Patent No. 27,290, dated February 23, 1860.

*To all whom it may concern:*

Be it known that I, W. W. HOWELL, of Columbus, in the county of Lowndes and State of Mississippi, have invented a new and useful Improvement in Cotton-Gins; and I do hereby declare that the following is a full, clear, and exact description of the same, reference being had to the accompanying drawings, forming a part of this specification, in which—

Figure 1 is a horizontal section in the line $y\,y$ of Fig. 2. Fig. 2 is a vertical longitudinal section of the same; and Fig. 3 is a side view of the same.

Similar letters of reference in each of the several figures indicate corresponding parts.

To enable others skilled in the art to make and use my invention, I will proceed to describe its construction and operation.

A B represent the frame. It may be of the form represented, or of any other better adapted to the successful employment of my invention. The part A of the frame, which contains or supports the thrashing mechanism, is hooked or temporarily connected to the part B, which contains the ginning mechanism, as shown at $a\,a$, so that when it is not desired to use the trasher with the gin it may readily be detached and set aside. It is very desirable to use the trasher in operating upon cotton which has been "storm" injured or blown out from the boll or picked off of the ground, but not in operating upon cotton picked from the stalk containing but little trash; hence the necessity of hinging the two frames together, as stated.

C is the trashing-cylinder, having short pins $b\,b$ projecting from its circumference. This cylinder rests above a reticulated concave, D, which terminates in a flue or spout, D', leading into the hopper of the gin. In front of the trashing-cylinder is arranged an endless feed-apron, $c$, which passes over rollers $d\,d$ and under a pressing lap-roller, $e$, as shown. The cylinder and concave are boxed in at rear and sides by means of boards $f\,f$, so as to be entirely separated from and placed beyond the influence of the ginning mechanism.

On the front end and at the base of the part B of the frame is arranged a trough, $g$, having a spiral screw-conveyer, $g'$, arranged to revolve in it so as to carry off the seed which fall from the hopper. This conveyer, or its equivalent, is very essential when the trasher is employed, as there is no possible chance of getting rid of the accumulating seed. Above the conveyer and slightly in rear of it is arranged the hopper of the saw-gin. The front $h$ of this hopper is hung on axial shaft $h'$, which passes through boxes in the two sides of the part B of the frame, and has its ends made square, so as to receive a crank, $i$, said crank having a connecting-rod, $j$, extending from it to near the front end of the trasher, at which point said rod attaches to a hand-lever, $k$. Having the crank-arm, connecting-rod, and lever thus arranged is very essential when the trasher is employed, for by the same the gate of the hopper can be opened or adjusted from the outside, and the seed thus discharged very conveniently without liability of the operators having their hands injured by the saws.

The back of the hopper forms the open-slitted breast $l$ for the saws $m$ to work through, said saws being arranged on a cylinder, E, located in such relation to the breast that its saws extend through the slits into the hopper. Behind the saw-cylinder are placed a mote or dirt brush, F, and a stripping-brush, G. The mote-brush revolves in a reverse direction to that in which the stripping-brush revolves, as indicated by the arrows. In order to supply air to the mote-brush I provide a transverse draft-flue, H, just in rear of it. This flue extends entirely across the part B of the frame, and is open at both ends. It also has small openings $n\,n$ leading to the brush. Above this flue, and running at right angles to it, is arranged a discharge-flue, I, for motes and dirt. This flue communicates with the space in which the brush revolves.

The air to the stripping-cylinder is supplied through a space, J, existing between the back board of the part A of the trasher-frame and the front end of the part B of the gin-frame, and escapes with the ginned cotton through the flue K.

L is a board hinged to the top of the part B of the frame, so as to turn up to a vertical position, as shown in black lines, or down to an inclined position, as shown in red lines. This board serves two offices, and is quite essential. When it is in the position shown in black it answers as a momentary back board to the flue of the trasher-concave, and prevents the cotton being thrown beyond the hopper of the gin-saws, and when in the position shown in red it answers as a table for the unginned cotton to rest upon while being fed into the hopper, and thus injury by straining to the thin metal forming the dirt-discharge spout avoided.

M M are collars or shoulders formed on the ends of the shafts of the brushes. These collars fit up snugly against the inner sides of the part B of the frame, and are of the same circumference as the circles described by the tips of the bristles forming the brushes. These collars act an important part, preventing any irregularity in the currents produced by the brushes, and thus destroying the chance of eddies forming at the points where they are located. Were these collars not formed on the shafts of the brushes at these points the currents produced by the shafts would be less than those produced by the brushes, owing to the difference in the circumference of the circles described by the bristles of the brushes and the shafts, and consequently friction of the air against the sides of the part B of the frame experienced.

The trashing-cylinder, saw-gin cylinder, mote and dirt brush, and stripping-brush are driven by belt-gearing, such as represented in the drawings. The only peculiarity in this gearing is the arrangement of the additional pulley, o, on the shaft P of the idler or tightening-pulley Q, so that the mote and dirt brush is driven from said shaft. This arrangement avoids the use of two of the shafts usually employed.

The operation is as follows: If the trashing-cylinder is used, the hinged board L is turned up to the position shown in black. The cotton is now fed by the apron to the trashing-cylinder, and trashed and opened up by the same. This being accomplished, the partially-cleaned cotton is thrown up by the cylinder into the hopper of the gin, taken hold of by the saws and drawn through the slitted breast. As the cotton passes through the breast, the seed are separated from it and fall back into the hopper. The cotton, being carried round by the saws to the mote and dirt brush, is whipped while straddling the saw-teeth by the same, and thus the mote and dirt knocked out, and, owing to a strong distributed current of air being drawn in as the brush revolves rapidly from the draft-flue H, are expelled through the discharge-flue I. The cotton is then stripped from the saws by the stripping-brush, and, owing to a strong equal current of air rushing in through the space J, is discharged through the flue K. If a large quantity of seed has collected in the hopper, the attendant has only to move the lever $k$ far enough to open the gate. This being done, the seed discharge into the conveyer-trough $g$, and are conveyed to an end discharge-passage of the same by the spiral conveyer $g'$.

If cotton picked from the stalk is to be ginned, the trasher is removed and the hinged board turned down to the position shown in red. This being done, the cotton is fed from the hinged board into the hopper.

What I claim as my invention, and desire to secure by Letters Patent, is—

1. The arrangement and combination of the trashing and preparing cylinder C, the folding top L, the conveyer $g\ g'$, with the cotton-gin, in the manner and for the purpose described.

2. The combination of a cylinder of ginning-saws $m\ m$, the two brushes F G, one a dirt-brush and the other a stripping-brush, the transverse draft or air flue H $n$, and the longitudinal dirt-discharge flue I, substantially as and for the purposes set forth.

W. W. HOWELL.

Witnesses:
 GOODWIN Y. AT LEE,
 R. W. FENWICK.